May 6, 1947.                H. McNAMARA                2,420,259
                      ANTI GLARE REAR VIEW MIRROR
                         Filed April 10, 1944
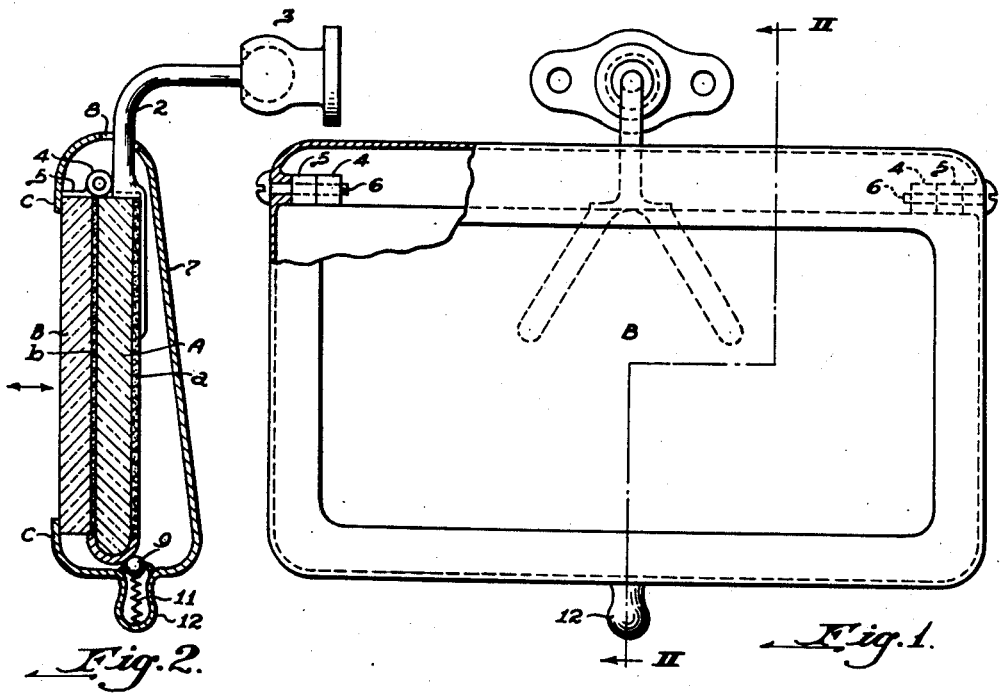
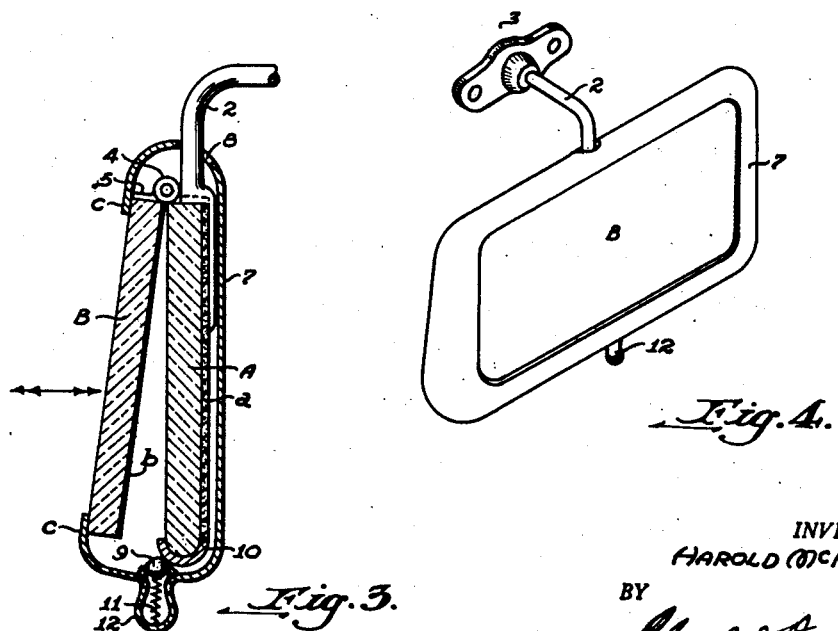
INVENTOR.
HAROLD McNAMARA.
BY
Clarke & Doolittle
his ATTORNEYS.

UNITED STATES PATENT OFFICE 2,420,259

ANTIGLARE REAR VIEW MIRROR

Harold McNamara, Butler, Pa.

Application April 10, 1944, Serial No. 530,299

6 Claims. (Cl. 88—77)

This invention is an improvement in that class of mirrors commonly used in motor vehicles for observing approaching cars from the rear, by the operator.

Ordinarily, as in daylight driving, a single reflecting mirror, set at a suitable angle, is sufficiently satisfactory under normal daylight conditions. Driving in darkness, as in night driving, however, is complicated by the reflected glare in a single mirror, from headlights of an oncoming car, and is both annoying and dangerous.

Various means have been proposed to obviate this objection, as by use of a protecting shield of colored or translucent glass or the like, in parallelism or entirely removed relation to the main reflecting mirror, and in different adjustable mountings, but all such prior constructions are of limited efficiency and complicated construction.

I have discovered that the efficiency of a mirror with a very thin silvered surfacing may be utilized for both day and night driving, when combined with a regular fully silvered mirror.

Also a construction whereby both are mounted within a surrounding frame, all supported by the main mirror arm and bracket, and for easy and convenient manipulation by the driver, of simple inexpensive construction, as hereinafter described.

Referring to the drawing showing one preferred construction:

Fig. 1 is a face view of the invention, partly broken away;

Fig. 2 is a cross section on the line II—II of Fig. 1 showing the front and rear mirrors together, for daylight driving;

Fig. 3 is a sectional view like Fig. 2 showing the front mirror adjusted angularly beyond the rear mirror;

Fig. 4 is an isometric view of the complete device.

As shown, the main conventional rear view mirror A is of full reflecting value, having the usual sufficient silvering or other reflecting surfacing $a$, fixedly connected as by arm 2 with the usual ball and socket mounting bracket 3.

The front mirror B is provided with a relatively very thin silvering surfacing $b$ of limited translucent or partially transparent and reflecting value as well. It is so mounted with relation to the rear mirror, and connected as at $c$, with a surrounding frame, as to be adjusted backwardly against mirror A, as in Fig. 1, or outwardly therefrom at an angle thereto, as in Fig. 3.

Thus, mirror A may have a pair of fixed hinge members 4, and mirror B has a corresponding pair of movable hinge members 5, engaging pivot pins or bolts 6, each mounted suitably in opposite corner portions of the frame 7.

Otherwise, a single middle hinge may be used, the frame 7 and fixedly connected front mirror B being free to swing together with relation to fixed mirror A.

Such frame may be of any suitable material, as sheet metal, plastic, or the like, thus firmly connected to mirror B, and the frame is preferably made of two or more connected sections, as preferred, for ease of assembly.

The rounded upper portion of frame 7 may be slotted, as at 8, for movement with relation to fixed arm 2, in adjusting the frame and mirror B outwardly or inwardly.

Means for fixedly holding the frame in either position are provided in any suitable manner, as by a spring pressed ball 9 engageable with a rounded bearing surface of mirror A, or a metal shoe 10 thereof, as preferred. The ball is under tension of spring 11 mounted in a tubular extension 12 of any suitable form.

Such extension may be used as a finger piece in tilting the frame and front mirror, or the frame may be merely grasped as preferred.

As thus constructed, the front mirror B may be thrust back and retained in contact with mirror A, or thrust outwardly beyond as shown, and the ball latch will firmly hold in either position, by engagement with the edge of mirror A, while also permitting easy movement of the frame either way.

The structure gives full reflection in the position of Fig. 2 due to the coacting reflections from mirrors A and B, while in the position of Fig. 3 the structure gives a reduced reflection since partial mirror B will cause a partial reflection of the objects at the rear off to an angle out of the operator's line of vision to thus reduce the visible reflection from mirror A.

The advantages of the invention and its construction will be readily understood from the foregoing description and will be appreciated by all those familiar with the use of automobiles.

It is extremely simple, cheap, durable, highly efficient, and easily operated to suit the driving conditions, and serves to greatly relieve the annoyance and risk of troublesome glare.

The device may be changed or modified in construction, proportions, details, or otherwise by the skilled mechanic, without departure from the following claims.

What I claim is:

1. In combination with a fixedly held full value reflecting mirror, a movable enclosing frame, a front semi-transparent mirror fixedly mounted in the frame and movable therewith, and means for adjusting the frame and front mirror outwardly from or inwardly towards the fixed mirror including hinge connections between the two mirrors and with the frame.

2. In combination with a full value rear reflecting mirror fixedly connected with a supporting arm, a front translucent mirror pivotally connected with the rear mirror, and a movable enclosing frame having a front opening and fixed edge connection with the front mirror and pivotally connected to said rear mirror whereby the front translucent mirror may be adjusted outwardly beyond the rear mirror with said frame.

3. In combination with a rear veiw mirror and mounting means therefor including an arm extending upwardly from the mirror, a semi-transparent mirror disposed over and coacting with the first mirror, means pivoting said mirrors together on a longitudinal axis at approximately the tops thereof, and a protecting frame for the mirrors carried by the second mirror and movable therewith on said axis relatively to the first mirror, said frame having an opening exposing the second mirror and marginally of the opening surrounding the second mirror, said frame also having an opening through which the arm passes, said second mentioned opening being enlarged with respect to the arm to accommodate the said relative movement of the mirrors.

4. In combination with a rear view mirror and mounting means therefor including an arm extending upwardly from the mirror, a semi-transparent mirror disposed over and coacting with the first mirror, means pivoting said mirrors together on a longitudinal axis at approximately the tops thereof and intersected by their meeting faces, and a protecting frame for the mirrors carried by the second mirror and movable therewith on said axis relatively to the first mirror, said frame having an opening exposing the second mirror and marginally of the opening surrounding the second mirror, said frame also having an opening in its top through which the arm passes, said second mentioned opening being enlarged with respect to the arm to accommodate the said relative movement of the mirrors, said frame having a rear wall in a plane inclined relatively to the second mirror to provide clearance for operation of the mirrors, a hollow handle depending from the frame, and latch means mounted in the hollow of said handle coacting with the first mirror to hold the mirrors in the different positions.

5. The combination of claim 3 wherein said longitudinal axis is approximately intersected by the meeting faces of the mirrors.

6. The combination of claim 4 wherein said frame is in one piece and said hollow handle is integral with said frame.

HAROLD McNAMARA.

REFERENCES CITED

The following references are of record in the file of this patent:

UNITED STATES PATENTS

| Number | Name | Date |
| --- | --- | --- |
| 2,239,452 | Williams et al. | Apr. 22, 1941 |
| 1,919,475 | McKinley | July 25, 1933 |
| 941,782 | Hubbard | Nov. 30, 1909 |
| 2,118,962 | Barron | May 31, 1938 |
| 1,513,769 | Sullivan | Nov. 4, 1924 |

FOREIGN PATENTS

| Number | Country | Date |
| --- | --- | --- |
| 270,234 | (Brit.) | Mar. 20, 1928 |